Figure 1:
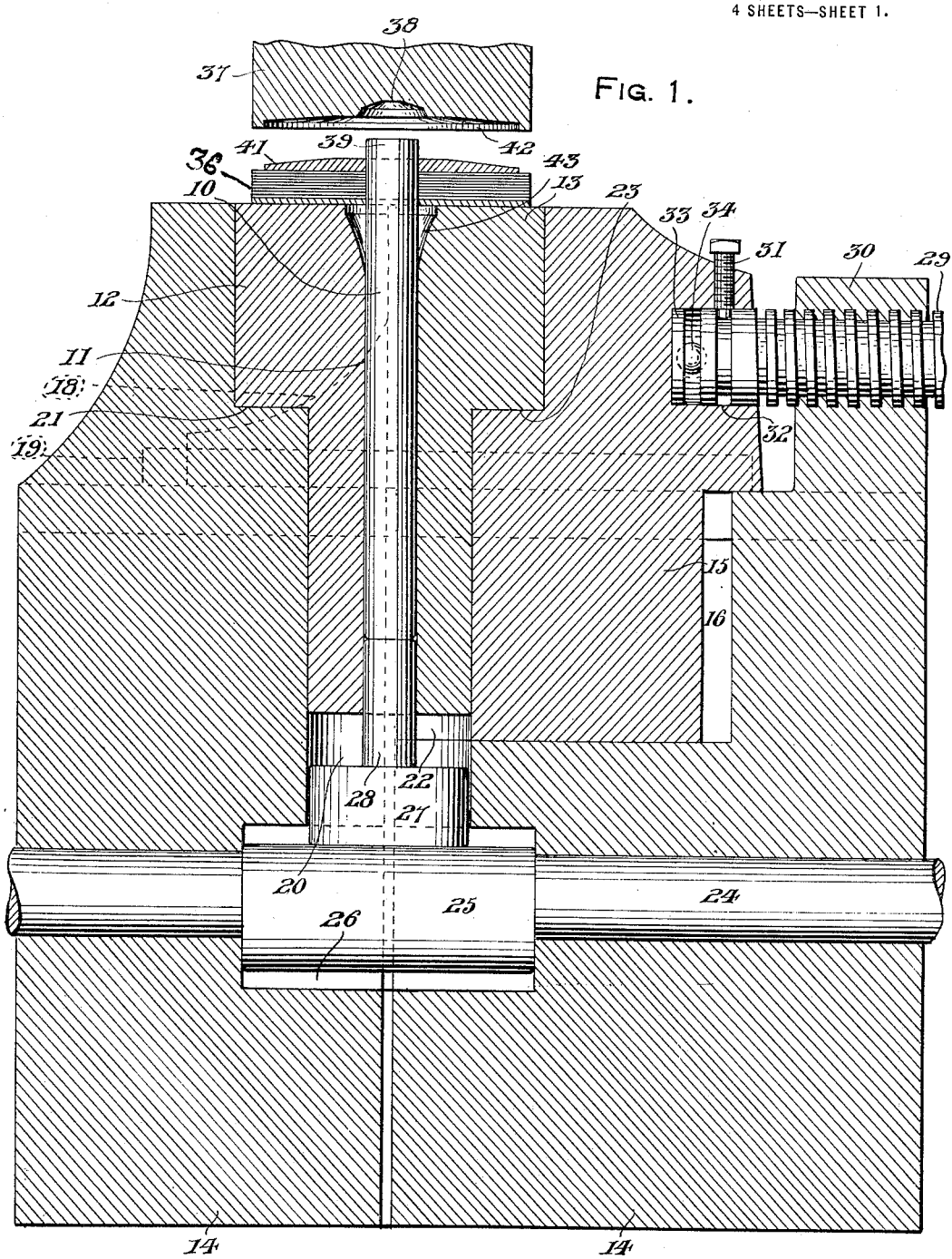

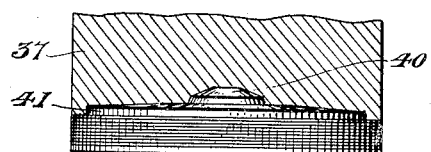
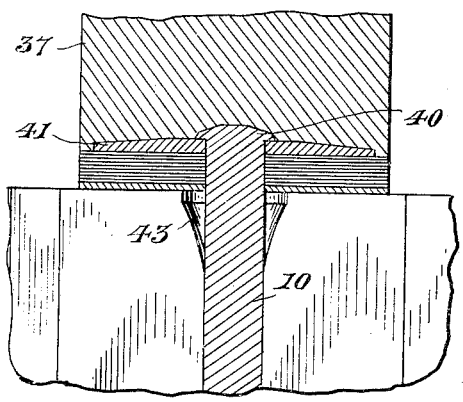
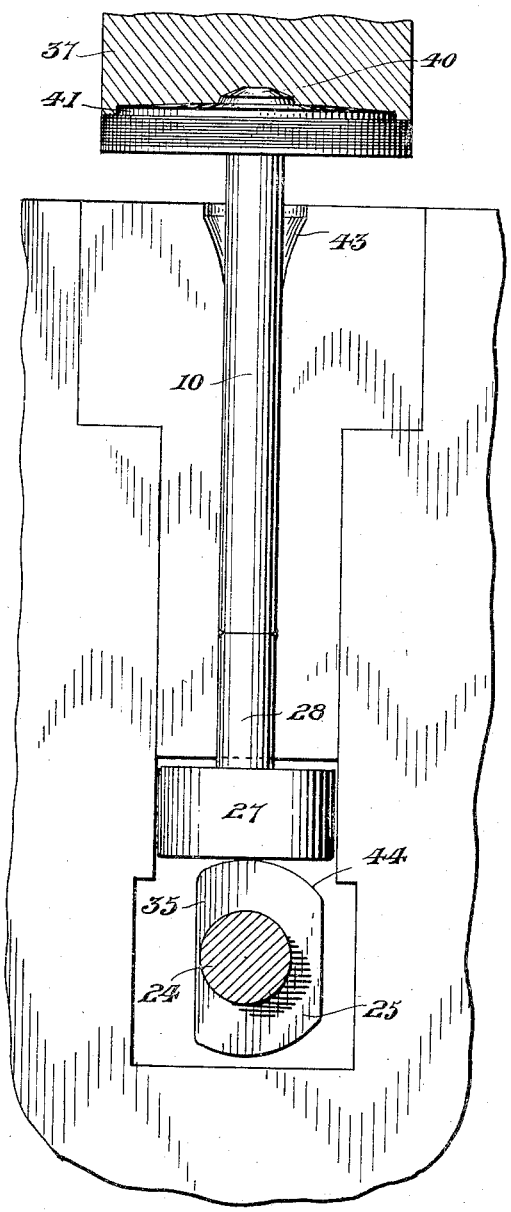
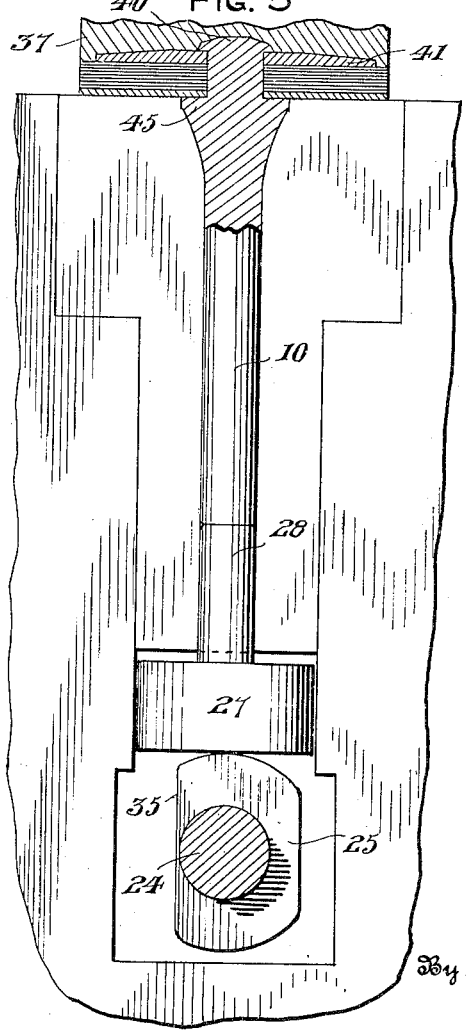

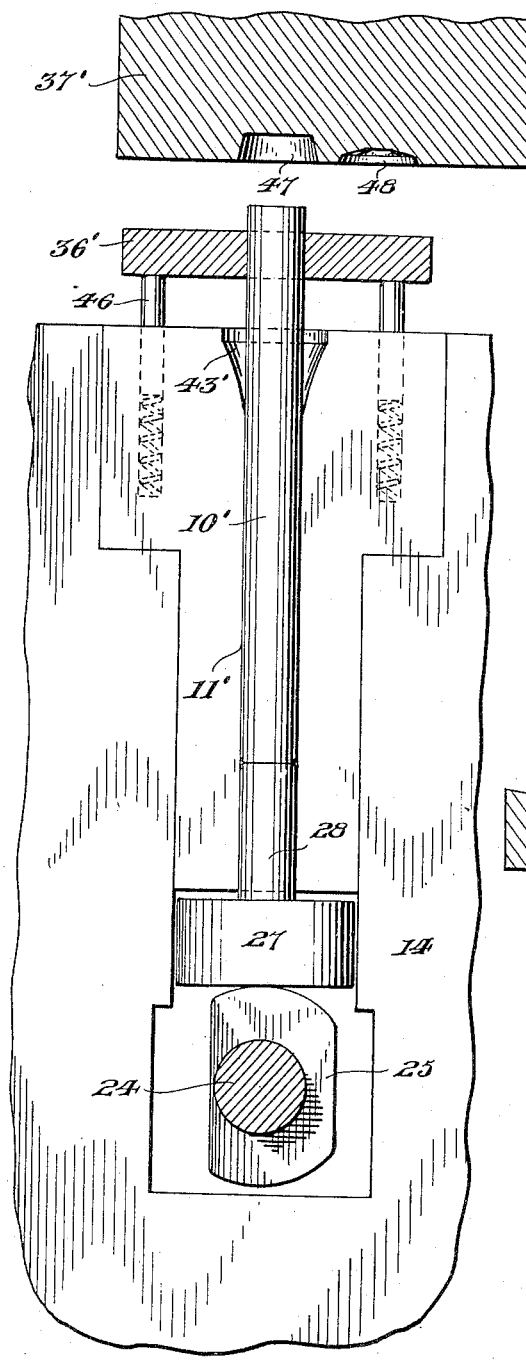
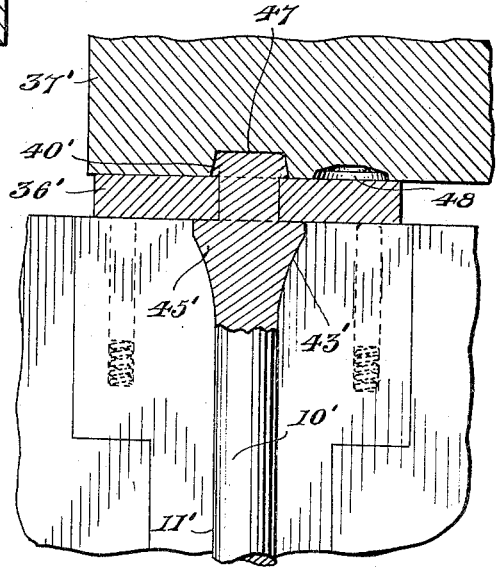
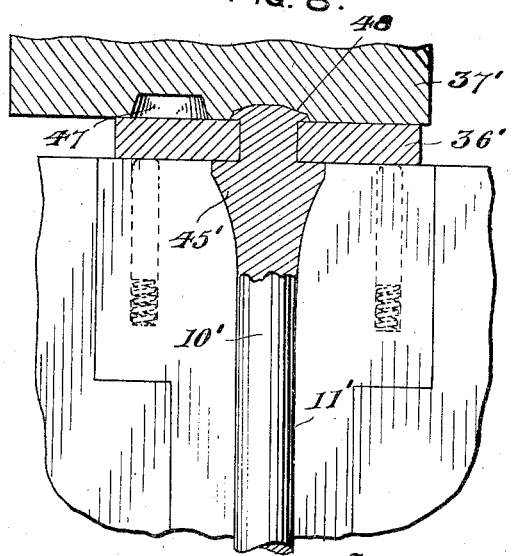

UNITED STATES PATENT OFFICE.

JAMES BIRRELL, OF CHICAGO, ILLINOIS, ASSIGNOR, BY DIRECT AND MESNE ASSIGNMENTS, TO SUPER VALVE CO., OF CHICAGO, ILLINOIS, A CORPORATION OF ILLINOIS.

METHOD OF UNITING THE HEADS AND STEMS OF VALVE MEMBERS.

1,382,052.  Specification of Letters Patent.  Patented June 21, 1921.

Application filed March 11, 1919. Serial No. 281,965.

*To all whom it may concern:*

Be it known that I, JAMES BIRRELL, a citizen of the United States of America, residing at Chicago, in the county of Cook and State of Illinois, have invented certain new and useful Improvements in Methods of Uniting the Heads and Stems of Valve Members, of which the following is a specification.

My invention is primarily designed for forming what is commonly termed a valve consisting of a head and stem by permanently uniting the head and stem in its assembled relations in a manner that is rapid in operation although inexpensively performed and whereby connection between the head and stem possesses great strength substantially equal to valves consisting of integral heads and stems.

The invention includes a method of uniting a valve stem and head by molding the stem into engagement with the head, whereby the employment of detachable and screw-threaded hold-fast devices is obviated and great strength secured at little expense in the formation of the valve member.

My method of mounting a head upon a valve stem is preferably accomplished by the apparatus herein shown although different forms of apparatus may be devised and I have illustrated the attachment of two different forms of heads upon a valve stem by slightly different forms of my method as well as apparatus for carrying out the same.

It is apparent that different material may be provided for the head and stem of the valve member, the same being designed to suit different wearing conditions and that the head will be securely mounted upon the stem preventing separation until the portions of the valve member are entirely worn out.

With these general objects in view, my method will be fully described in connection with the accompanying drawings disclosing two forms of apparatus for carrying out the method and in which drawings like reference characters designate corresponding parts throughout the several views.

Figure 2:
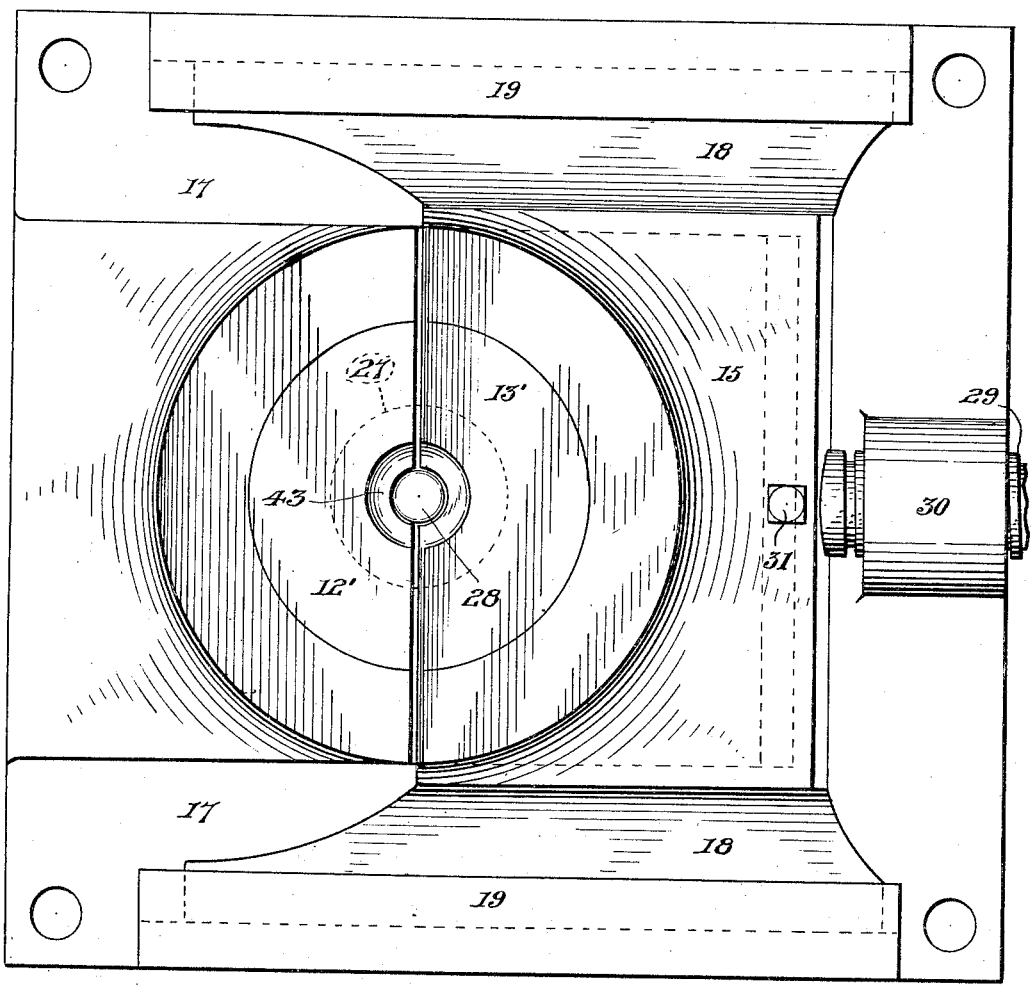

In the drawings,

Figure 1 is a vertical central sectional view of the preferred form of apparatus for carrying out my method of mounting a head upon a valve stem, the apparatus being illustrated ready for operation, Fig. 2 is a top plan view of the apparatus in its open position with the top die removed.

Fig. 3 is a view similar to Fig. 1 showing the first step in the cycle of operations, that of upsetting or heading the end of the stem over the valve head, Fig. 4 shows the next step of the method in elevating the stem and head as well as the top die, Fig. 5 illustrates the last step in the cycle of operations, that of forming the abutment or shoulder upon the stem engaging beneath the valve head, Figs. 6, 7, and 8 illustrate a modified form of apparatus for carrying out the method in a slightly different manner and in which the shoulder and upset end are simultaneously formed upon the valve stem, the form of the upset end being completed by a subsequent step.

My invention contemplates the uniting of a head and stem of any desired material into a complete valve member which in itself is a complete article of manufacture. A cylindrical stem such as 10, herein illustrated in Figs 1, 3, 4, and 5, is formed of such metal as steel and in its highly heated condition is mounted within the bore 11 of a two-part die consisting of opposite sections 12 and 13. A holder is provided for the two-part die 12—13 consisting of a stationary bed 14 with a movable jaw or section 15 slidably positioned upon the bed 14.

The jaw section 15 rests within a recess 16 in the upper face 17 of the bed 14 while opposite flanges 18 of the jaw 15 are slidably positioned beneath marginal guides 19 upon the bed top 17. The die 12—13 is T-shaped in cross section with the half 12 thereof mounted in a vertical passage 20 of the block 14 and resting upon a semicircular seat 21. The opposite half 13 of said die is positioned in the semicircular inner face 22 of the jaw 15 seated upon the shoulder 23 formed in said face. By this arrangement, it will be seen that the die section 13 of the die is movable with the jaw section 15 toward and away from the die section 12.

A shaft 24 journaled through the block 14 perpendicularly beneath the passage 20 is provided with a flattened cam 25 adapted for turning within a chamber 26 in the bed 14 centrally beneath the passage 20 while a follower having a foot 27 in constant engagement with the cam 25 and with its arm 28 slidably positioned in the bore 11 beneath the stem 10 is adapted to be elevated when desired upon the rotation of the shaft 24 and cam 25. A screw 29 is threaded through a boss 30 upon the bed 14 with its inner end swiveled by means of a screw 31 into a socket 32 in the adjacent side of the jaw section 15. A thrust bearing is preferably provided at the inner end of the socket 32 comprising a washer 33 and an anti-friction ball 34 positioned between said washer and the adjacent inner end of the operating screw 29. It will be seen that by turning the screw 29 in the required direction, that the jaw section 15 may be bodily moved as desired either inwardly or outwardly for either releasing the die section 13 from the stem 10 and the opposite die section 12 or moving the die section 13 toward the said stem and the die section 12.

In carrying out my method, the stem 10 is positioned upon the upper end of the arm 28 within the bore 11 when the foot 27 of the follower is seated upon the flat anvil portion or side 35 of the cam 25 and with the upper end of the stem 10 projecting above the exposed upper faces 12' and 13' of the die sections 12 and 13 respectively. The valve head 36 is provided with a central opening through which the stem 10 is positioned with the head 36 mounted upon the upper die face 12'—13', the die sections 12 and 13 being secured in flat engagement with each other by means of the screw 29. It being understood that the stem 10 is highly heated and mobile, a reciprocating die 37 is forced downwardly with its central form or recessed face 38 engaging the upper end 39 of the stem 10 which forms the head 40 upon the upper end of the stem 10. The lowering of the reciprocating die 37 also tends to compress the valve head 36 upon the die face 12'—13' while forming the overturned portion 40 upon the stem which engages the top plate 41 of the head 36, the engaging face of the die 37 preferably having an accommodating recess 42 therein for receiving the plate 41.

The stem 10 is prevented from lowering during the downward movement of the die 37 by reason of the cam 25 and follower member as illustrated in Fig. 1 of the drawings and when the overturned head 40 is molded upon the upper end of the stem 10 by the die 37, the shaft 24 and cam 25 are turned for elevating the follower and forcing the stem 10 with its head 36 upwardly, the die 37 being also simultaneously elevated and positioning the members as illustrated in Fig. 4. The previous heading of the stem 10 by the die 37 causes the operation of the stem within the valve head 36 to slightly expand, whereby the subsequent elevating of the stem 10 carries the head 36 therewith as indicated in the drawings.

The outer end of the die 12—13 is provided with a central countersink 43 forming a flaring outer end for the bore 11 through which the stem 10 extends with the stem seated upon the follower arm 28 and the follower foot 27 seated upon the curved face 44 of the cam 25. The reciprocating die 37 is then forcibly lowered carrying the head 36 therewith until the head 36 engages the die face 12'—13' and which operation shortens the length of the stem 10 forcing the surplus amount of heated metal of which the stem 10 is formed into the flaring portion 43 of the bore 11 in the shape of an annular shoulder or flange 45 upon the valve stem engaging beneath the head 36.

In the cycle of operations necessary to unite the stem 10 and head 36 together, the heated stem 10 is first positioned centrally through the head 36, the reciprocating die 37 overturns the upper end of the stem 10 in the form of a head 40 engaging the outer face of the valve head while the next step expands the heated stem into an annular abutment or shoulder 45 engaging the inner face of the valve head 36. It is apparent that upon releasing the jaw section 15 by means of the screw 29, the die sections 12 and 13 may be removed as well as the valve member which has been formed. The follower 27—28 is also removable so that a die 12—13 having a bore 11 of a different diameter may be readily employed as well as a follower having a different size arm 28 while the length of the finished valve stem may be governed by the length of the follower arm 28 although the stem 10 may be cut to any length desired after the valve member has been completed. The shaft 24 and reciprocating die 37 may be operated by any desired means which it is unnecessary to herein illustrate but it will be seen that the die 37 may be operatively lowered and the cam 25 subsequently turned for elevating the elements including the die 37 and the die 37 is then subsequently forcibly lowered for forming the shoulder 45 so that the entire operation of uniting the valve head 36 with the stem 10 may be quickly and easily accomplished.

In Figs. 6, 7, and 8, the steps of my method have been slightly modified, being carried out by the apparatus therein disclosed which in all of its essentials is the same as the apparatus shown in Fig. 1. The same form of operating shaft 24 with its cam 25 and a follower having a foot 27 and an arm 28 are provided in the bed 14. The heated valve stem 10' is positioned upright within the bore 11' of the die 12" having a flaring portion 43' for said bore 11'.

A valve head 36' herein illustrated of solid formation is positioned over the stem 10' mounted upon upwardly extending spring pressed pins 46 carried by the die 12'. A reciprocating die 37' is mounted above the head 36', adapted to be forced downwardly upon the head 36' with a bottom recess 47 in the die 37' receiving the upper free end of the stem 10'. The further downward movement of the die 37'" forces the head 36' downwardly, expanding the heated stem 10' into the flared bore portion 43' forming the shoulder 45' upon the stem beneath the head 36' and also slightly expanding the upper end of the stem 10' into a cap portion 40' as illustrated in Fig. 7 of the drawing. By this means, the overturning of the free end of the stem as well as the formation of the shoulder 45' is accomplished in one operation by means of the die 37'. The cap 40' is designed to be formed into proper shape, however, by elevating the die 37' and shifting the same for mounting a form face or recess 48 over the cap 45 and then depressing the die 37' to produce the desired form upon the end of the stem 10' on the outer face of the valve head 36' as illustrated in Fig. 8 of the drawings. It will be understood that the pins 46 mount the head 36' in proper position upon the stem 10' for securing the shoulder 45' and cap 40'.

What I claim as new is:—

1. A method of mounting a valve head upon a heated mobile stem, consisting in the following steps, to wit: preventing movement of one end of the stem, forcibly engaging the other end of the stem with a die for upsetting into engagement with the outer face of the valve head, and then exerting longitudinal pressure upon the stem whereby an integral shoulder is formed upon the stem in engagement with the inner face of the valve head.

2. A method of uniting a head and stem consisting in projecting a stem in mobile condition through the head, overturning one end of the stem outwardly of the head and subsequently forming an integral shoulder upon the stem by compression inwardly of the head.

3. A method of securing a head upon a stem consisting in providing a stem in mobile condition, holding a major portion of the stem immovable and overturning one end of the stem in a terminal cap formation and subsequently exerting pressure longitudinally of the stem whereby the stem is shortened and extended into a shoulder spaced inwardly of said cap.

4. A method of forming a valve consisting in positioning a heated stem projecting through a valve head, oversetting the free end of the stem outwardly of the head by means of pressure adapted for simultaneously expanding the stem within the head whereby the head is prevented from longitudinal movement upon the stem and subsequently compressing the stem longitudinally forming an expanded shoulder portion engaging the inner face of the head.

5. A method for attaching a head upon a valve stem consisting in projecting a heated stem through a valve head and then compressing the stem longitudinally with separate operations to form an overturned end outwardly of the head and an expanded shoulder inwardly of the head.

In testimony whereof I affix my signature.

JAMES BIRRELL.